United States Patent [19]

Koseki

[11] Patent Number: 4,527,227
[45] Date of Patent: Jul. 2, 1985

[54] FALSE RECOVERY DETECTION CIRCUIT FOR PARALLEL OR SERIAL STRINGS OF THYRISTORS

[75] Inventor: Shoichiro Koseki, Ishioka, Japan

[73] Assignee: Hitachi, Ltd., Tokyo, Japan

[21] Appl. No.: 513,315

[22] Filed: Jul. 13, 1983

[30] Foreign Application Priority Data

Jul. 15, 1982 [JP] Japan ................................. 57-122054

[51] Int. Cl.³ ............................................... H02H 7/12
[52] U.S. Cl. ....................................... 363/54; 363/57; 307/252 L
[58] Field of Search ............ 307/252 J, 252 K, 252 L; 363/54, 67, 68, 57

[56] References Cited

U.S. PATENT DOCUMENTS

| | | | |
|---|---|---|---|
| 3,806,906 | 4/1974 | Young | 363/54 |
| 4,100,434 | 7/1978 | Iyotani et al. | 363/68 |
| 4,325,114 | 4/1982 | Kobayashi et al. | 363/68 |

*Primary Examiner*—William H. Beha, Jr.
*Assistant Examiner*—Jeffray Sterrett
*Attorney, Agent, or Firm*—Antonelli, Terry & Wands

[57] ABSTRACT

A thyristor converter control system comprising a voltage detector for detecting the thyristor voltage and a detector output suppressing circuit provided at the output of the voltage detector. The detector output suppressing circuit operates to detect an erroneous output of the voltage detector that it provides a voltage-presence signal while it must provide a voltage-absence signal, and cuts off the output of the voltage detector upon detecting the erroneous output from the voltage detector.

8 Claims, 6 Drawing Figures

FALSE RECOVERY DETECTION CIRCUIT FOR PARALLEL OR SERIAL STRINGS OF THYRISTORS

The present invention relates to a thyristor converter control system and, particularly, to a control system for a large capacity thyristor converter having thyristor arms of a plurality of thyristors connected in a serial or parallel configuration.

A thyristor converter control system generally incorporates voltage detectors for detecting the voltage applied to thyristors of each, and thyristor firing circuits which operate by receiving the detector output as one firing condition. In particular, for a large capacity thyristor converter, the voltage detectors are multiplexed in order to enhance the reliability of the control system. The multiplexed detector outputs are summed logically to provide an operational condition of the thyristor firing circuits. Due to the multiplexed voltage detecting system, even if some voltage detectors fail to report the presence of voltage, remaining normal voltage detector(s) provide a correct signal as an output of the logical sum. This is the conventional scheme of the control system for operating the thyristor converter.

However, a voltage detector will not always fail to report the presence of voltage, but might fail to report the absence of voltage and in this case the multiplexed output is erroneous even if remaining voltage detectors provide correct information. For example, if a thyristor firing circuit operates according to such erroneous signal, a protective firing pulse, which should be applied to thyristors when the reverse voltage period of the thyristor arm is too short will be missed out, resulting possibly in a deterioration of the thyristor characteristics. That is, such multiplexed voltage detecting system has an adverse effect on the system reliability in case a voltage detector fails to report the absense of voltage, and thus it is not eligible for the control system of a large capacity thyristor converter of which the reliability is highly requested.

It is an object of the present invention to provide a thyristor converter control system which provides a correct multiplexed output even if some voltage detectors fail to report the absence of voltage.

The principal feature of the present invention is the provision of a detector output suppressing circuit at the output of each voltage detector, so that the suppressing circuit detects the occurrence of a missing report on the absence of voltage thereby to cut off the faulty output of the voltage detector. As a result, firing of thyristors can be controlled normally by the outputs of remaining voltage detectors, whereby reliability of the thyristor converter control system can be enhanced significantly.

The present invention will be apparent from the following detailed description taken in conjunction with the accompanying drawings, in which.

Figure 1:
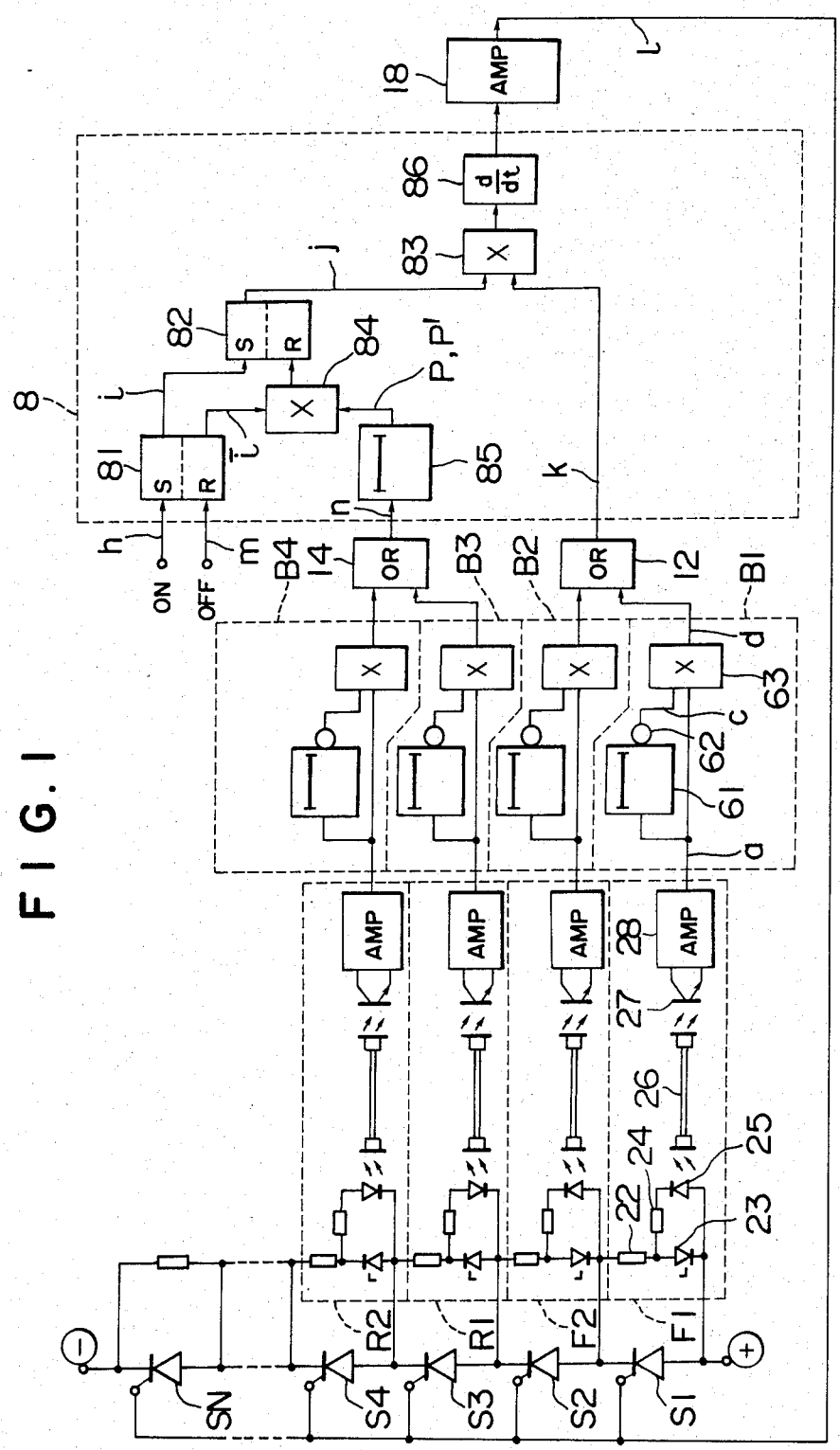
FIG. 1 is a block diagram showing one embodiment of the inventive thyristor converter control system.

In FIG. 1 showing one embodiment of the invention, there is shown one set of thyristor arms in the thyristor converter, which is made up of a serial connection of thyristors S1, S2, S3, . . . , and SN. The thyristors S1 and S2 are connected with forward voltage detectors F1 and F2, respectively, and the thyristors S3 and S4 are connected with reverse voltage detectors R1 and R2, respectively. Namely, the arrangement of this embodiment has duplex forward voltage detectors and reverse voltage detectors. Each of the forward voltage detectors F1 and F2 consists of a serial connection of a voltage division resistor 22 and a Zener diode 23 for the thyristor, a serial connection of a resistor 24 and a light emitting diode 25 connected in parallel to the Zener diode 23, a light guide 26 for conducting the optical signal produced by the light emitting diode 25 to a photo-transistor 27, and an amplifier 28 for amplifying the signal transduced by the photo-transistor 27. The reverse voltage detectors R1 and R2 are arranged identically to the forward voltage detectors F1 and F2, except that the Zener diode 23 and light emitting diode 25 are connected in an opposite polarity relationship. The voltage detectors F1, F2, R1 and R2 are connected to detector output suppressing circuits B1, B2, B3 and B4, respectively. Each of the suppressing circuits B1–B4 consists of a delay circuit 61, a signal inverting circuit 62 and an AND gate 63. The outputs of the suppressing circuits B1 and B2 are received by an OR gate 12, and the outputs of the suppressing circuits B3 and B4 are received by an OR gate 14. The outputs of the OR gates 12 and 14 are supplied to a firing circuit 8, which consists of flip-flops 81 and 82, AND gates 83 and 84, a delay circuit 85, and a differentiation circuit 86. The output of the firing circuit 8 is delivered through an amplifier 18 to the gates of the thyristors S1–SN.

Figure 2:
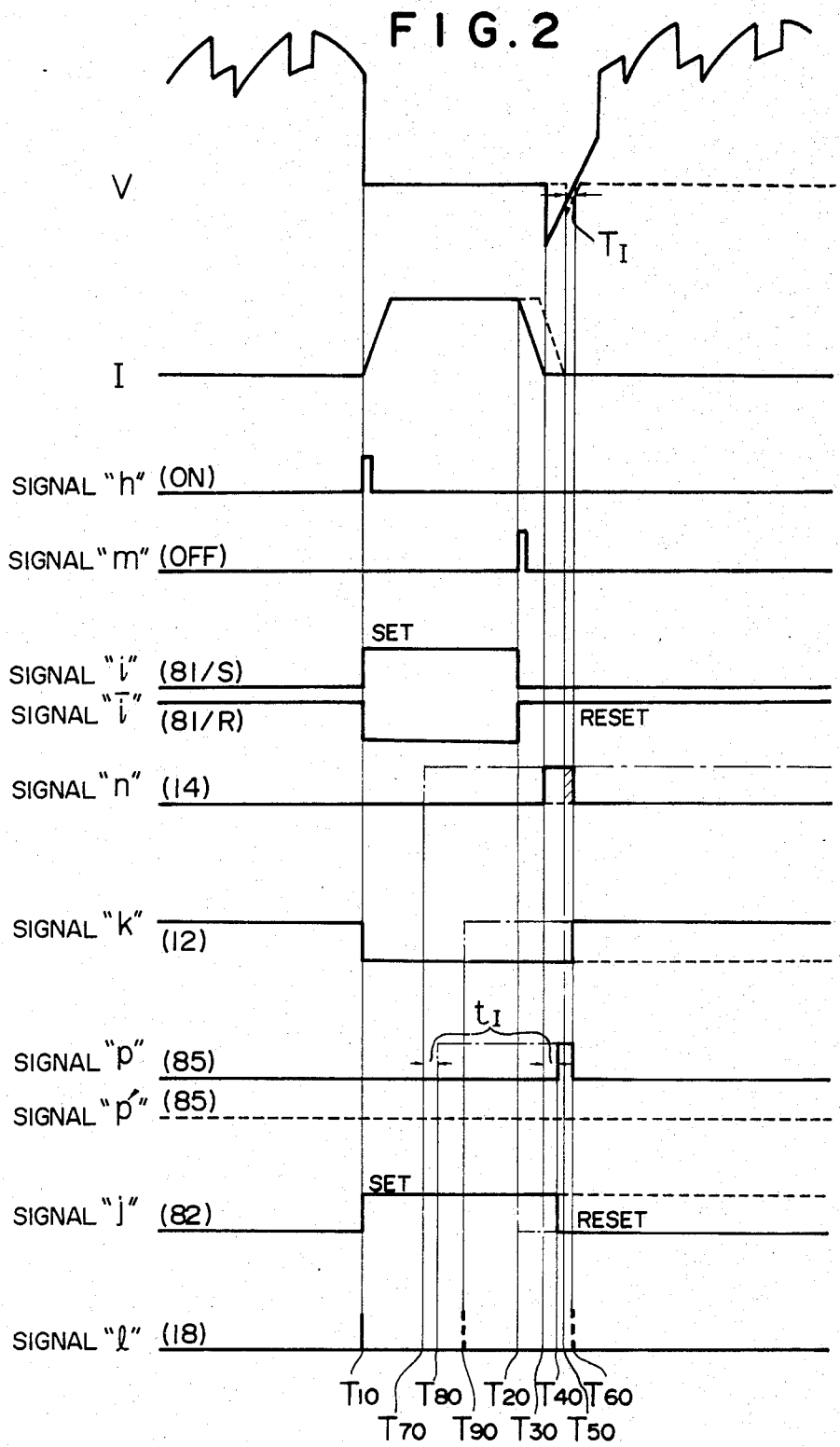
FIG. 2 is a waveform diagram showing output signals observed at various portions of the arrangement shown in FIG. 1.

The following describes the operation of the firing circuit 8 with reference to the waveforms of FIG. 2 for the case of the thyristor converter operating in the inverter mode. In the figure, waveform V shows the voltage across a thyristor, and waveform I shows the current flowing through the thyristor.

At time point $T_{10}$, the flip-flop 81 receives at its set input an ON pulse signal indicated by "h", and outputs a set signal "i". In response to the set signal "i", the flip-flop 82 outputs a set signal "j". The AND gate 83 takes logical product for the signal "j" and a forward voltage signal "k" from the OR gate 12, and the resultant output signal is fed through the differentiation circuit 86, amplified by the amplifier 18, then supplied as a firing signal "l" to the thyristor S1–NS. At time point $T_{20}$, the flip-flop 81 receives at its reset input an OFF pulse signal "m", and outputs a reset signal "i". The delay circuit 85 receives the reverse voltage signal "n" from the OR gate 14 at time point $T_{30}$ and operates to delay the leading edge of the signal by a certain period $t_I$ and outputs a delayed signal "p" at $T_{40}$. The AND gate 84 takes logical product for the delayed signal "p" and the reset signal "i", and provides an output to reset the flip-flop 82. In consequence, another firing signal "l" will not be generated until the ON pulse "h" is issued again. These are the normal operations of the firing circuit 8.

On the other hand, if, for example, the ON pulse for the next phase is given late, the thyristor voltage V will have a shorter reverse voltage period ($T_{50}$–$T_{60}$) as shown by the dashed line. If the reverse voltage period $T_I$ becomes shorter than the predetermined period $t_I$, the delay circuit 85 will no longer provide a delayed output signal as shown by p'. Consequently, the flip-flop 82 is not reset, but it causes to generate a forced firing signal l when the thyristor voltage V turns to a forward cycle at $T_{60}$. Thus, the firing circuit 8 operates to fire all series-connected thyristors forcedly when the reverse voltage period is too short, thereby preventing a specific thyristor from breaking by an excessive voltage caused by partial turn-off.

The firing circuit 8, however, does not suffice in the following cases. First, assuming that one of the reverse voltage detectors fails to report the absence of voltage at $T_{70}$, the reverse voltage signal "n" and delayed signal "p" turn high level at $T_{70}$ and $T_{80}$, respectively. Then, the flip-flop 82 resets the set signal "j" at $T_{20}$ at which the OFF pulse signal m is generated. In consequence, even if the reverse voltage period $T_I$ of the thyristor voltage V is actually shorter than the specified period $t_I$, it is not detected and thus the forced firing signal l is not generated, resulting possibly in a destruction of a specific thyristor due to partial turn-off. Secondly, assuming that one of the forward voltage detectors fails to report the absence of voltage at $T_{90}$, the forward voltage signal "k" goes high at $T_{90}$. Then, unnecessary forced firing signal l is produced at $T_{90}$ and a necessary forced firing signal is not provided at $T_{60}$, resulting possibly in a destruction of a specific thyristor due to partial turn-off. These are the deficiencies of the prior art control system for thyristor converters.

Figure 3:
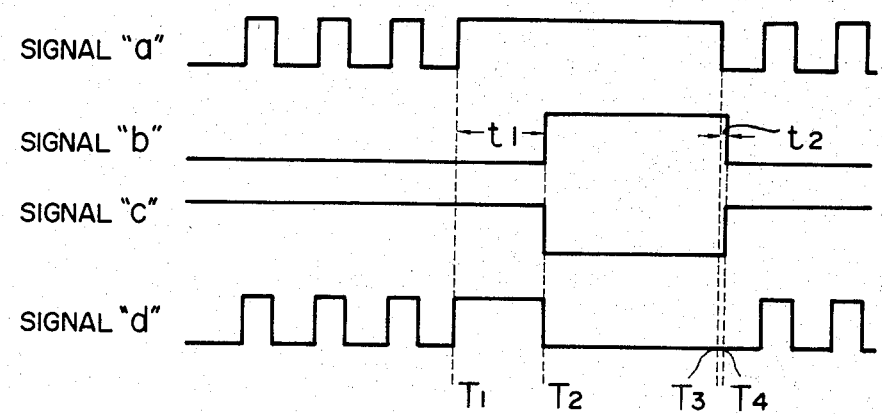
FIG. 3 is a waveform diagram explaining the operation of the detector output suppressing circuit.

Accordingly, the inventive control system is provided with the detector output suppressing circuits B1-B4 at the output of respective voltage detectors as shown in FIG. 1, so that if a voltage detector fails to report the absence of voltage, it is detected by the associated suppressing circuit thereby to cut off the output of the voltage detector. For example, if the forward voltage detector F1 fails to report the absence of voltage, the associated detector output suppressing circuit B1 operates as follows. The detected voltage signal "a" is delivered to the delay circuit 61 and AND gate 63. On receiving the voltage signal "a", the delay circuit 61 provides an output signal "b" with its leading edge delayed by a period of $t_1$ and with its trailing edge delayed by a period of $t_2$ as shown in FIG. 3. The signal "b" is inverted by the inverting stage 62 to form a signal "c". By receiving the signals "a" and "c", the AND gate 63 provides an output signal "d". Accordingly, if the voltage detector F1 fails to report the absence of voltage at $T_1$, its output is cut off by the suppressing circuit B1 at $T_2$. When the voltage detector F1 recovers the normal operation at $T_3$, the detector output is conducted to the input of the OR gate 12 without being cut off by the suppressing circuit after time point $T_4$. Namely, the OR gate 12 receives only normal signal from the voltage detector F2 during the period from $T_2$ to $T_4$. In consequence, the OR gate 12 is not given erroneous information for a long duration. This is also true in case the detector F1 is normal and the detector F2 fails to report the absence of voltage, and also in the case where one of the reverse voltage detectors R1 and R2 provides an erroneous output.

Figure 4:
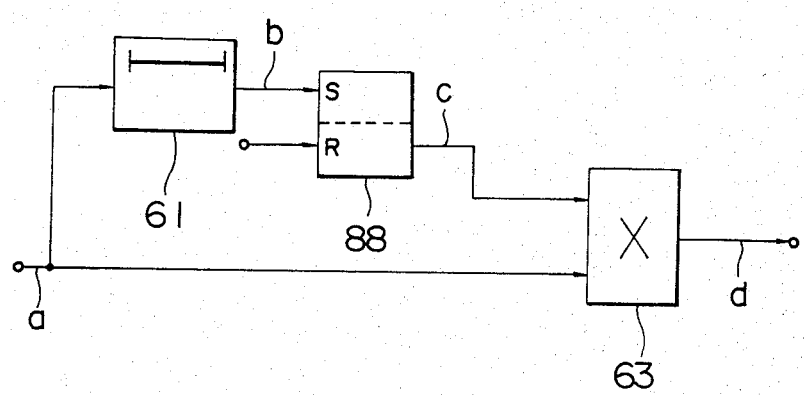
FIGS. 4 and 5 are block diagrams showing different embodiments of the detector output suppressing circuit according to the present invention.

The detector output suppressing circuits B1, B2, B3 and B4 may be arranged to have a flip-flop 88 receiving at its set input the output signal "b" of the delay circuit 61 so as to provide the signal "c" of FIG. 3, as shown in FIG. 4. In this case, the signal "c" is reset through the reset input of the flip-flop 88 at time point $T_4$.

Figure 5:
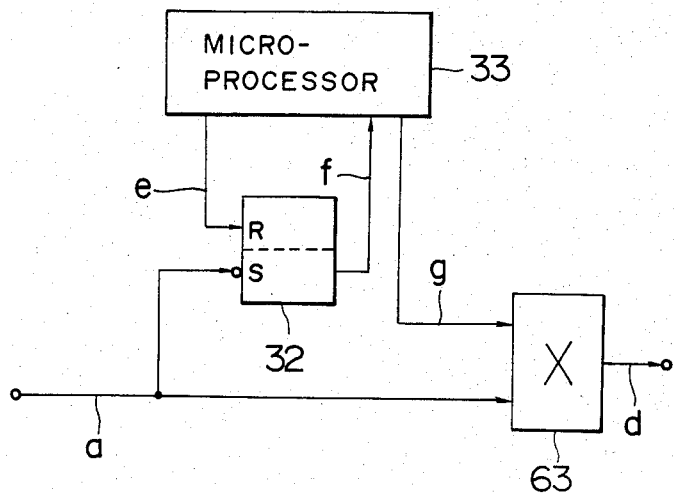
Figure 6:
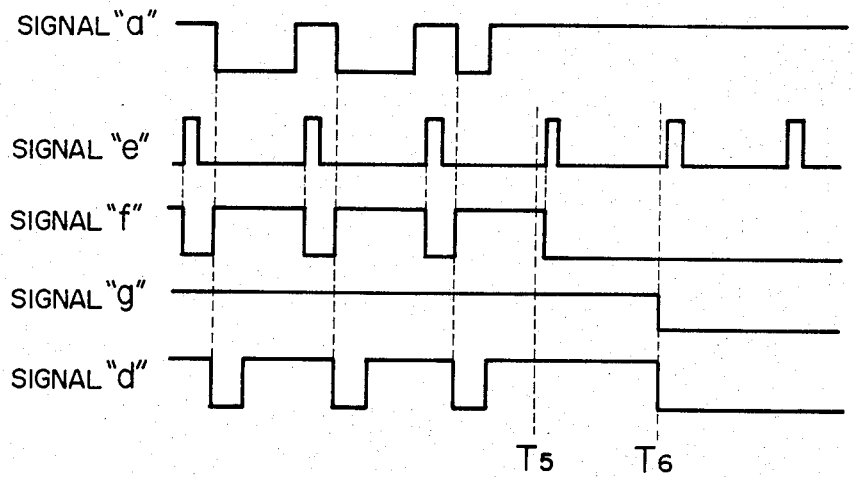
FIG. 6 is a waveform diagram explaining the operation of the circuit shown in FIG. 5.

FIG. 5 shows another embodiment of the detector output suppressing circuits B1, B2, B3 and B4, wherein a microprocessor 33 is employed in the circuits. In this embodiment, the microprocessor 33 operates to issue a periodic signal "e" to reset the flip-flop 32. If the voltage detection output signal "a" goes low at least once during the period between contiguous reset pulses, the flip-flop 32 is set again. The microprocessor 33 fetches the set output "f" of the flip-flop 32 immediately before resetting it (e.g., at timing $T_5$ and $T_6$), and determines that the voltage detection output signal is normal if the signal "f" is active, or the output signal is missing if the signal "f" is inactive. Then the microprocessor 33 issues a resultant determination signal "g" to the AND gate 63. In FIG. 6, the failure of the voltage-absence reporting signal is detected at $T_6$, and thereafter the signal "a" is suppressed to form signal "d".

In the foregoing embodiments, the period for the determination of failure, i.e., period $t_I$ in the embodiment of FIG. 2, or the reset interval in the embodiment of FIG. 5, may be set to a time length of a half cycle to several cycles of the power voltage applied to the thyristor arm. Setting of too short determination period can cause malfunctioning of the control system. For example, in a single-phase, fullwave rectifying system, the voltage is applied occasionally in its entire half cycle, and the determination period must not be set shorter than that duration. In a three-phase bridge rectifying system, the smaller limit of the determination period is the ⅚ cycle length. On the other hand, setting of too long determination period sacrifices the gate control function of the system during that period. In general, the best setting of the determination period will be 2-cycle length of the power voltage, i.e., 40 ms for the 50 Hz power system, so that the suppressing circuit responds to two consecutive failures of the voltage detection signal.

Although the voltage detection system of FIG. 2 is duplexed in the above embodiments, the present invention is applicable to multiplex systems in higher degree. Although light guides are used in the voltage detection system of the above embodiments, it is of course possible to use other means such as photocouplers or isolating amplifiers. Although in the above embodiments the voltage is detected on each of series-connected thyristors, the voltage across several thyristors or across the whole thyristor arm may be detected. The forward and reverse voltages need not always be detected by separate thyristors as shown in FIG. 1, but arrangement may be made so that both the forward and reverse voltages are detected across each thyristor or across several series-connected thyristors. The foregoing embodiments can also be applied to a parallel connection of thyristors.

What is claimed is:

1. In a thyristor converter control system comprising a serial connection of a plurality of thyristors, at least two voltage detectors for detecting a voltage applied to said thyristors, and a firing circuit for providing firing signals for said thyristors, wherein a logical sum of outputs of said voltage detectors is used as one of the operational conditions of said firing circuit, the improvement comprising the provision of a detector output suppressing circuit means provided at the output of each of said voltage detectors, said detector output suppressing circuit means detecting an erroneous output of said voltage detector when said detector provides an erroneous voltage-presence signal rather than a correct voltage-absence signal, said detector output suppressing circuit means cutting off the output of said voltage detector upon detecting said erroneous output from said voltage detector.

2. A thyristor converter control system according to claim 1, wherein said detector output suppressing circuit means comprises a delay circuit which delays the output of said voltage detector by a predetermined period, an inverting circuit for inverting the output of said delay circuit, and a logical AND gate which takes logical product for the output of said inverting circuit and the output of said voltage detector.

3. A thyristor converter control system according to claim 1, wherein said detector output suppressing circuit means comprises a delay circuit which delays the output of said voltage detector, a flip-flop which is set by the output of said delay circuit, and a logical AND gate which takes a logical product for the reset output of said flip-flop and the output of said voltage detector.

4. A thyristor converter control system according to claim 1, wherein said detector output suppressing circuit means comprises a flip-flop which is set by the output of said voltage detector, a microprocessor which resets said flip-flop periodically and provides a high level signal if said flip-flop is in a set state in an interval of resetting or provides a low level signal if said flip-flop is in a reset state in an interval of resetting, and a logical AND gate which takes a logical product for the output of said microprocessor and the output of said voltage detector.

5. In a thyristor converter control system comprising a parallel connection of a plurality of thyristors, at least two voltage detectors for detecting a voltage applied to said thyristors, and a firing circuit for providing firing signals for said thyristors, wherein a logical sum of outputs of said voltage detectors is used as one of the operational conditions of said firing circuit, the improvement comprising the provision of a detector output suppressing circuit means provided at the output of each of said voltage detectors, said detector output suppressing circuit means detecting an erroneous output of said voltage detector when said detector provides an erroneous voltage-presence signal rather than a correct voltage-absence signal, said detector output suppressing circuit means cutting off the output of said voltage detector upon detecting said erroneous output from said voltage detector.

6. A thyristor converter control system according to claim 5, wherein said detector output suppressing circuit means comprises a delay circuit which delays the output of said voltage detector by a predetermined period, an inverting circuit for inverting the output of said delay circuit, and a logical AND gate which takes a logical product for the output of said inverting circuit and the output of said voltage detector.

7. A thyristor converter control system according to claim 5, wherein said detector output suppressing circuit means comprises delay circuit which delays the output of said voltage detector, a flip-flop which is set by the output of said delay circuit, and a logical AND gate which takes a logical product for the reset output of said flip-flop and the output of said voltage detector.

8. A thyristor converter control system according to claim 5, wherein said detector output suppressing circuit means comprises a flip-flop which is set by the output of said voltage detector, a microprocessor which resets said flip-flop periodically and provides a high level signal if said flip-flop is in a set state in an interval of resetting or provides a low level signal if said flip-flop is in a reset state in an interval of resetting, and a logical AND gate which takes a logical product for the output of said microprocessor and the output of said voltage detector.

* * * * *